Patented Apr. 8, 1930

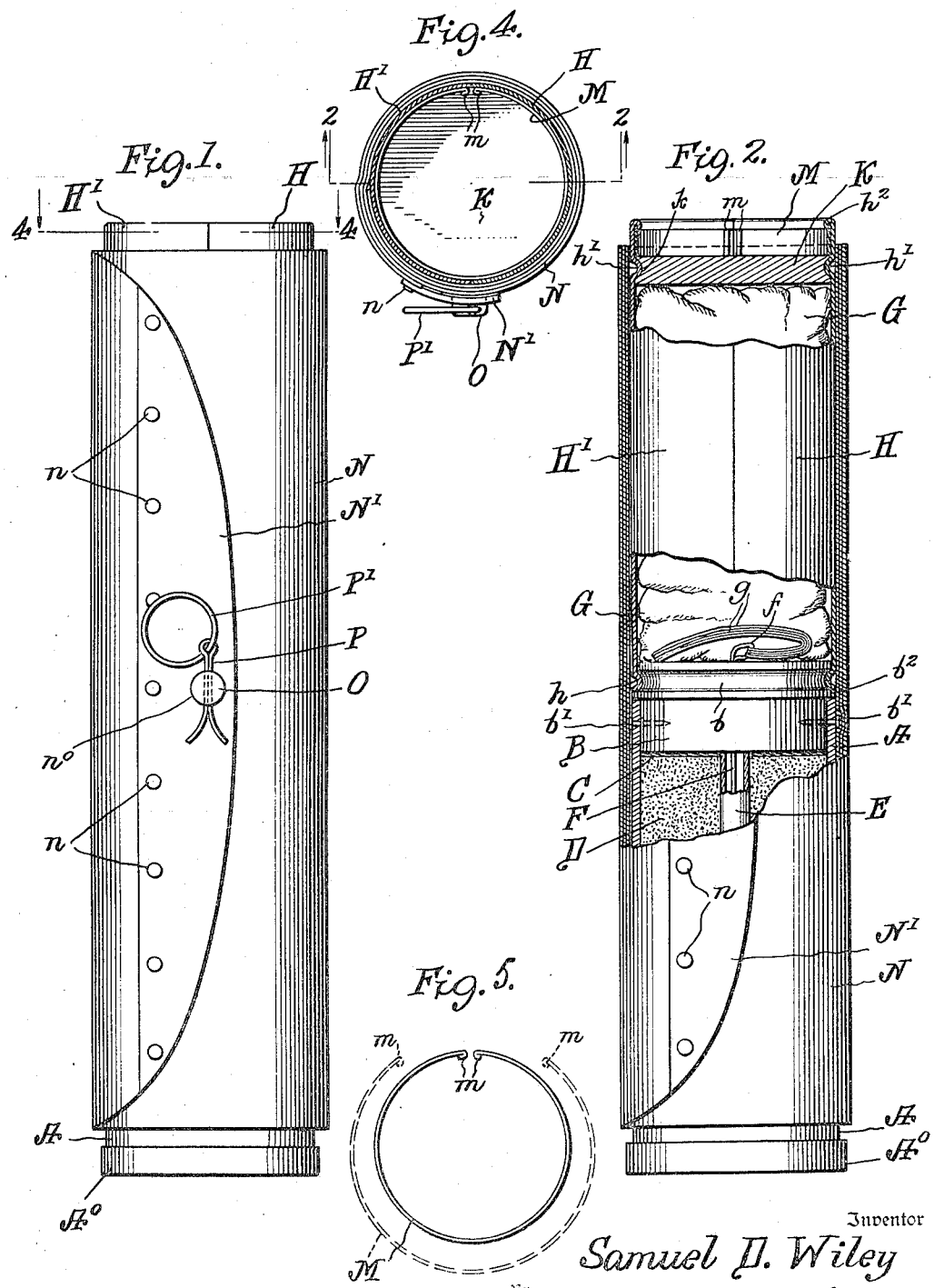

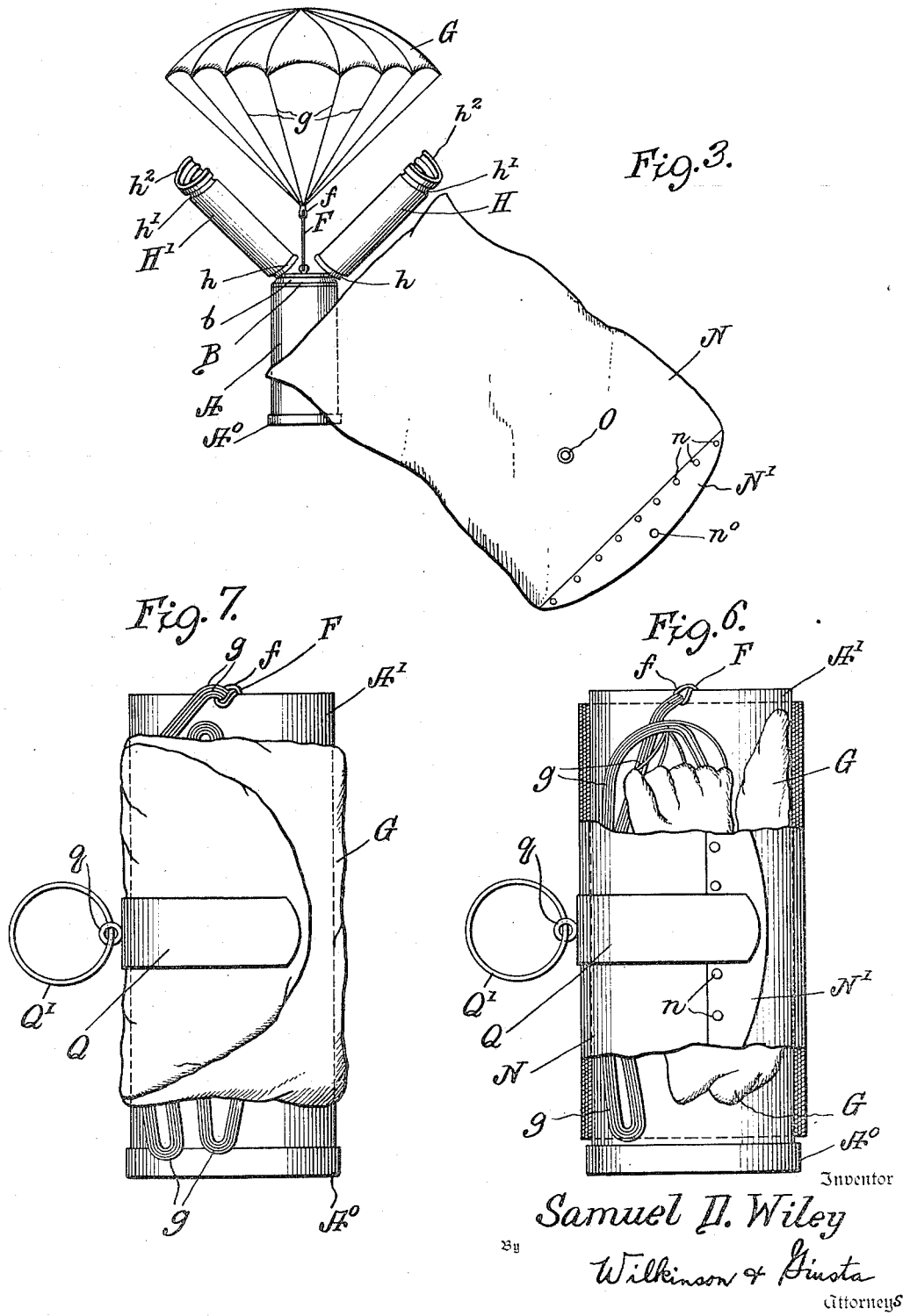

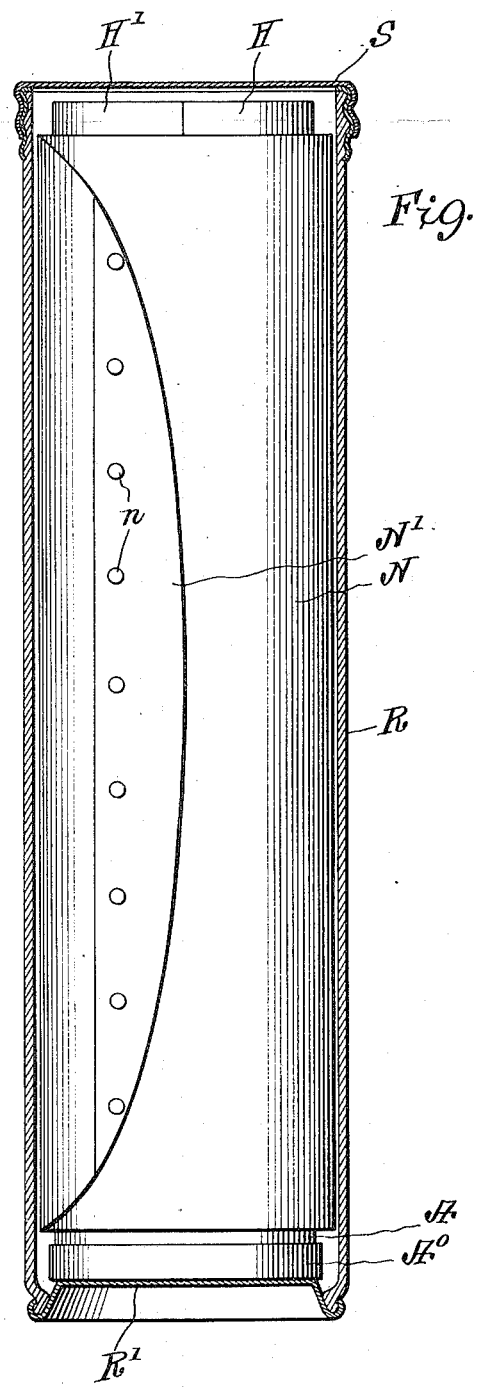
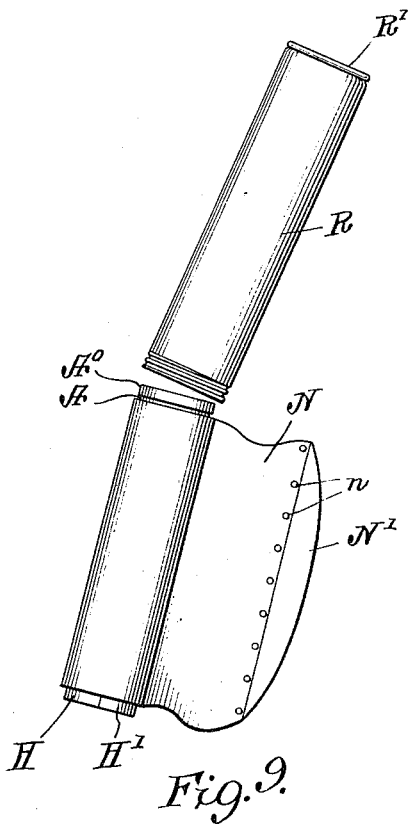

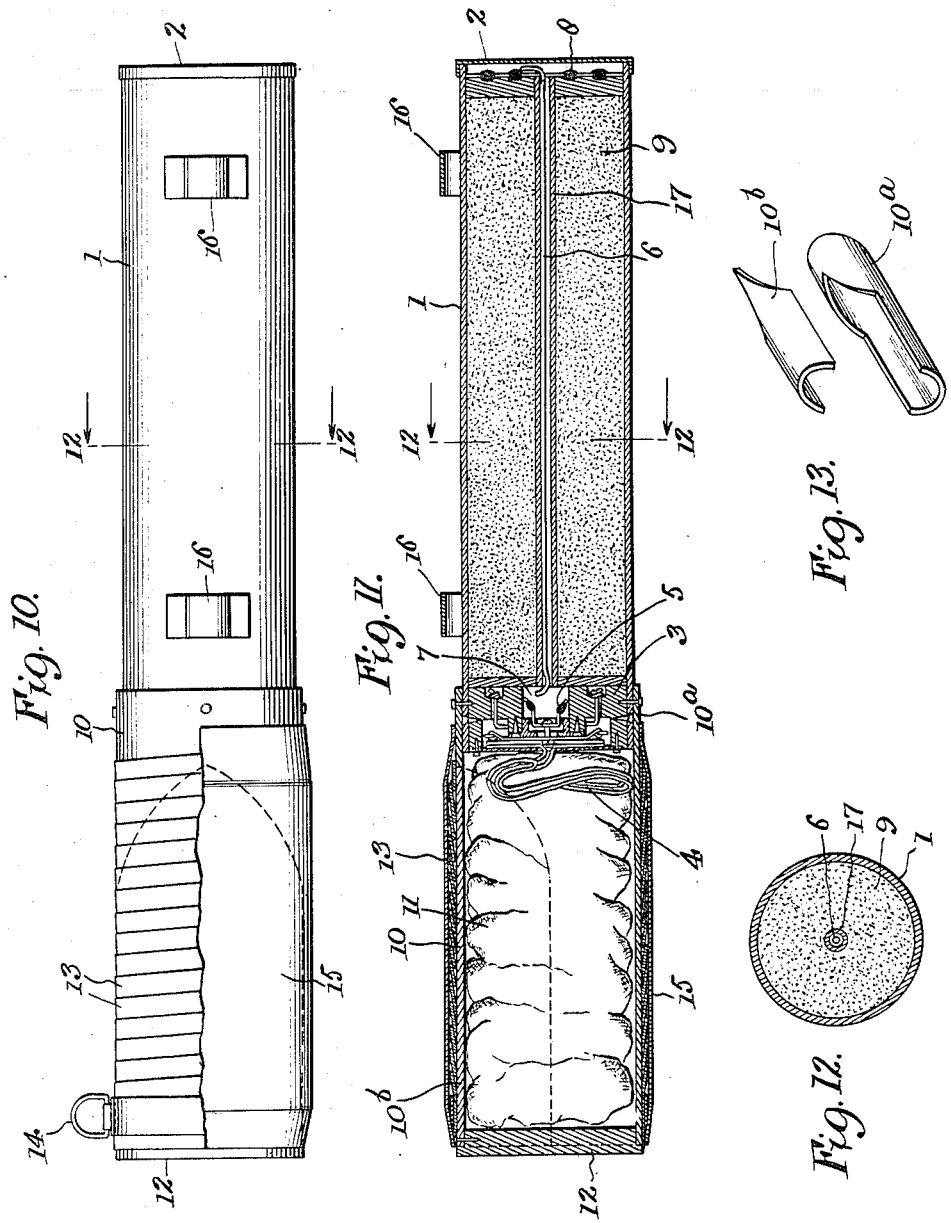

1,754,134

UNITED STATES PATENT OFFICE

SAMUEL D. WILEY, OF METUCHEN, NEW JERSEY

MEANS FOR OPERATING AIRCRAFT LIGHTS

Application filed June 24, 1929. Serial No. 373,328.

There are many types of signals and flares in use for aircraft that either automatically ignite when released or are manually operated. Now if a pyrotechnic device of this sort is prematurely fired in the aircraft very serious results may occur, and to overcome this hazard, I have devised a method of release whereby the signal or flare can be used and released by the operator with the greatest safety.

My invention particularly makes safe the release of signals or flares that would ordinarily ignite as soon as they leave the plane. These flares may be either of the parachute or non-parachute type, igniting either by the opening of the parachute or having a mechanical igniter.

The present invention has been devised with the above and other objects in view, and it consists in certain novel arrangements and combinations of parts, and in the details of construction, as will be hereinafter described and claimed; it being understood that changes in the precise embodiment of the invention herein disclosed may be made within the scope of what is claimed without departing from the spirit of the invention.

A practical embodiment of the invention is shown by way of illustration in the accompanying drawings, in which like parts are indicated by similar reference symbols, and in which Figure 1 is a front elevation of the flare and parachute enclosed in a wrapper adapted to unfold and clear itself of the flare, as will be hereinafter described.

Figure 2 is a sectional elevation of the apparatus shown in Figure 1, along the lines 2—2 in Figure 1 and looking in the direction of the arrows.

Figure 3 is a view of the device on a smaller scale after the wrapper has fallen off and the parachute has become distended. The figure illustrates the action diagrammatically.

Figure 4 shows a section along the line 4—4 of Figure 1, and looking down.

Figure 5 is a detail view showing the spring which effects automatically the operation of the casing for the parachute, the said spring being shown in full lines in the compressed condition and in dotted lines in the distended position.

Figure 6 is a sectional elevation of a modification, in which the parachute is mounted outside of the flare container and is normally held in place by a wrapper and spring clip.

Figure 7 shows a further modification, in which the parachute itself is used as a wrapper and held in place by a spring clip.

Figure 8 is still another modification, in which the flare and parachute casings are held in the wrapper and slipped into an outer container.

Figure 9 shows the flare and parachute casing after it has been allowed to fall out of the container, and when the wrapper is partly unfolded.

Figure 10 shows an elevation, parts being broken away, of another modification, in which the parachute casing is composed of two separable parts and the parachute and flare casing are both of non-metallic material.

Figure 11 shows a central vertical section along the line 11—11 of Figure 10 and looking in the direction of the arrows.

Figure 12 shows a section along the line 12—12 of Figures 10 and 11 and looking in the direction of the arrows, and Figure 13 is a perspective view on a smaller scale showing the two parts of the parachute casing before being attached to the flare casing.

Referring first to the construction shown in Figures 1 to 5, A represents the container or casing in which the flare composition D is enclosed. This container is closed at its lower end by the cap $A^0$, and at its upper end by the plug B, which is firmly held in the container in any convenient way, as by the screws or nails $B'$. This plug is preferably provided with an annular shoulder $B^2$ which rests on the top of the casing A, and above this shoulder I may provide an annular groove $b$.

Below the plug B is a disk or washer C which is interposed between the bottom of the plug and the top of the flare composition D. The flare may be ignited by any well-known form of igniter, such, for instance, as a friction igniter, not shown, operated by a jerk on the wire F which is connected, as by the groove $f$, to the stay $g$ of the parachute G, as shown most clearly in Figure 3. This wire F passes freely through the tube E, as shown in Figure 2. H and H' are two semi-cylindrical shells having their lower ends $h$ preferably pressed into the annular groove $b$, as shown in Figure 2, and between these two semi-cylindrical shells the parachute G is packed, and above the parachute, I provide a head K which is preferably grooved as at $k$, so that the beads on the shells H and H' may be pressed into this groove, as indicated at $h'$ in Figure 2.

Above this groove, the shells H and H' are flanged inwardly, as at $h^2$, to hold in place the spring M, shown in detail in Figure 5. The ends of this spring may be bent over, as at $m$, if desired, so as to avoid possibly cutting the operator when he presses the spring in place.

Around the casing A and the two semi-cylindrical shells H and H' a sheet or ribbon N is wrapped. This may be made of any suitable flexible material such as cotton, silk, woven wire, leather, or any suitable flexible material, and when this wrapper is applied, it will hold the lower ends of the two members H and H' in engagement with the groove $b$ and will also hold the upper ends of these members against the outward pressure of the spring M.

In order to facilitate the unwinding of the wrapper from the casings beneath, I provide the free end thereof with a weight N' which may be secured to the edge of the wrapper in any convenient way as by the rivets $n$. This wrapper may be fastened in place in any convenient way as by means of the stud O, shown in Figures 1 and 3, which passes through the opening $n^o$ in the weight N', and is perforated to receive the cotter pin P, to the end of which pin the ring P' is attached.

By pulling on this ring with sufficient force, the cotter pin P will be withdrawn, and the weight N' will tend to slip over the pin O to permit the unwinding of the wrapper as the device falls through the air.

In order to operate the device, pull out the cotter pin and throw the casings with the wrapper around them overboard from the aircraft, and as the body falls, the pressure of the air will cause the wrapper to unwind, and finally it will become free of the casing, as indicated in Figure 3.

As soon as the wrapper becomes clear of the semi-cylindrical shells H and H', the spring M will tend to throw the upper ends of these shells outward, as shown in Figure 3, and the parachute will be released, and the rapidly falling flare body will cause the parachute to become distended, all as shown diagrammatically in Figure 3.

In this figure, I have shown the shells about falling away and the wrapper also falling away, but obviously, these parts would not fall away at exactly the same time, and this figure is intended merely to illustrate the action.

In this figure, I have also shown the cap $A^o$ on the flare casing just before it is blown off following the jerk of the parachute on the wire F which ignites the friction primer, as is well-known in the art.

In the modification shown in Figure 6, instead of enclosing the parachute between two semi-cylindrical shells, I may wrap the parachute around the flare casing A' and enclose this in an outer wrapper N similar to that already described.

For use with this form of device, a spring clip Q will form a suitable clamp for keeping the wrapper in the closed position, which clip may be withdrawn when desired by pulling on the ring Q' fastened to the eye $q$. In this case, after the body falls a short distance, the wrapper will unwind as before explained, and when the parachute becomes distended, it will jerk on the wire F and ignite the friction primer, as before described.

Of course, before throwing the flare overboard from the aircraft, the spring clip Q will be withdrawn. In the modification shown in Figure 7, instead of using a separate wrapper, I employ the parachute itself as a wrapper and wind it around the flare casing A' and clamp it in place with the spring clip Q which carries the eye $q$, to which the ring Q' is attached.

Before throwing the flare of this construction overboard, the spring clip Q should, of course, be detached, and the pressure of the air will cause the parachute to unwind, and it will become distended and operate the friction primer, as already explained.

In the form of device shown in Figures 8 and 9, the wrapper N is rolled tight around the flare casing A and the two semi-cylindrical shells H and H', and this body is then inserted in an enclosed cylindrical container R, having one end permanently closed by the cap R', and the other end closed by the screw cap S. When it is desired to throw the flare overboard, unscrew the cap S and turn the container R with the open end down, and the flare will fall out, and the wrapper N will unwind, releasing the shells H and H' and allowing the parachute to operate as already explained with reference to Figure 3.

In the form of device shown in Figures 10 to 15, the cylindrical flare casing 1 is made of a suitable material, preferably of cardboard, fiber, or the like, which may be made water-proof as by paraffining, and the other end of which is closed by a water-proof cap 2.

A plug 3 is securely fastened in the rear end. This plug serves both as an anchor for the suspension cable 4 and houses the friction igniter 5. The quick match 6 carries the flame from the igniter 7 to the primer 8 of the illuminating composition 9.

The parachute case 10 containing the parachute 11 is also in the form of a tube of strong fiber or cardboard securely attached to the flare casing 1. The parachute case is made in two parts 10$^a$ and 10$^b$ preferably snugly fitting against each other, but not actually connected together, so that these two parts will separate at the proper time, as will be hereinafter described.

The part 10$^a$ is fastened at its forward end to the flare case, but is not attached to the closing plug 12 of the parachute casing, while the part 10$^b$ of the parachute case is securely attached to said plug 12.

These two parts are held together when in the assembled relation by means of the tape winding 13. This winding is applied so as to completely cover the junction between the two parts 10$^a$ and 10$^b$ of the parachute casing, and hold this casing and its contents in the proper position attached to the flare casing until after the device has been released, as will be hereinafter described.

The outer end of the tape is preferably provided with a ring 14 which projects through the paper wrapping 15 which may be oiled or paraffined so as to make the device more water-proof. The flare casing may be provided with lugs or eyes 16 for convenience in suspending the flare in the racks. The flare is provided with the usual central tube 17, through which the flame is transmitted by the quick match 6 in the usual well-known way.

The other parts of the device are similar to those already described in connection with the other figures. The whole construction provides a light and comparatively cheap water-proof equipment, which may be conveniently suspended horizontally or otherwise in the racks, and when ready for use, the apparatus is taken out of the racks, the ring 14 is either held in the fingers of the operator or engages a hook on the aircraft, and the device is thrown overboard. As it falls, the unwinding tape will tear off the paper wrapping 15. As it unwinds and when the tape is completely unwound from the parachute casing, the part attached to the rear plug of the casing will fall away, and the parachute will be thrown out by the force of the wind as the heavier flare descends.

When the parachute becomes distended, the sudden jerk will ignite the friction primer, and this will ignite the flare, and the flare will descend slowly supported by the parachute, as already described. It will be seen that until the tape is completely unwrapped, the flare is perfectly safe; and as the tape may be made of sufficient length, for instance, fifteen feet or more, the parachute cannot open until it is far enough away from the aircraft, so that there is no possibility of its hanging on any part of the aircraft.

By making the flare water-proof, it may be conveniently used either on seaplanes or landplanes, and either protected from the weather, or exposed to the weather, as preferred.

Moreover, by making it light and safe, supplies of same can be conveniently stored in the wings of the plane and then put in the racks or other places, ready for use when desired.

By the construction shown in Figures 10 to 13, not only is a cheaper and lighter apparatus prepared, but one which may be conveniently used either in a horizontal or vertical position, as preferred; and to operate same, it is only necessary to engage the ring 14 in the hook on the aircraft and throw the apparatus overboard, when the weight of the same will automatically effect the releasing of the parachute at a safe distance from the airplane, and the opening of the parachute will ignite the flare.

Any suitable time interval may be provided by which the candle may be illuminated after the opening of the parachute, but such devices are well known in the art and not part of my present invention.

In all forms of the device hereinbefore described, it will be noted that there will be the unwinding of the wrapper of some kind from the flare casing, and that this unwinding action will require an appreciable interval of time, and until the wrapper is completely unwound from the casing, the parachute will fail to operate, and thus the device is foolproof and will fail to operate until it has fallen through a sufficient distance through the air to be entirely clear of any possible danger to the aircraft or any persons carried thereby.

It will be obvious that the time interval between the throwing overboard of the device and the igniting of the flare composition may be increased or decreased by varying the number of folds of the wrapper, and thus a comparatively short or long time interval may be secured as may be desired.

While I have described the invention in its preferred form, it will be obvious that various changes might be made in the construction, combination and arrangement of parts which could be used without departing from the spirit of my invention.

Having thus described my invention, what I claim and desire to secure by Letters Patent of the United States is:—

1. An aerial signal arrangement comprising a flare casing, a parachute connected to said casing, a detachable parachute housing made of a plurality of separable parts, and a flexible wrapper wound around said casing and said housing, and normally securing said casing and said housing together but releasing the parts of said housing from engagement with said casing when said wrapper is unwound.

2. An aerial signal arrangement comprising a flare casing, a parachute connected to said casing, a detachable parachute housing made of a plurality of separable parts, and a flexible wrapper wound around said casing and said housing, and normally securing said casing and said housing together but releasing the parts of said housing from engagement with said casing when said wrapper is unwound, with automatic means for separating the parts of said housing, and thereby releasing said parachute, when said wrapper is unwound.

3. An aerial signal arrangement comprising a flare casing, a parachute connected to said casing, a detachable parachute housing made of a plurality of separable parts, and a flexible wrapper wound around said casing and said housing, said wrapper having its outer edge weighted, said wrapper normally securing said casing and said housing together but releasing the parts of said housing from engagement with said casing when said wrapper is unwound.

4. An aerial signal arrangement comprising a flare casing, a parachute connected to said casing, a detachable parachute housing made of a plurality of separable parts, and a flexible wrapper wound around said casing and said housing, said wrapper having its outer edge weighted, said wrapper normally securing said casing and said housing together but releasing the parts of said housing from engagement with said casing when said wrapper is unwound, with automatic means for separating the parts of said housing, and thereby releasing said parachute, when said wrapper is unwound.

5. An aerial signal arrangement comprising a flare casing, a parachute connected to said casing, a detachable parachute housing made of a plurality of hollow cylindrical segments, and a flexible wrapper wound around said casing and said segments, and normally securing said casing and said housing together but releasing the parts of said housing from engagement with said casing when said wrapper is unwound.

6. An aerial signal arrangement comprising a flare casing, a parachute connected to said casing, a detachable parachute housing made of a plurality of hollow cylindrical segments, and a flexible wrapper wound around said casing and said segments, and normally securing said casing and said housing together but releasing the parts of said housing from engagement with said casing when said wrapper is unwound, with automatic means for separating the segments of said housing, and thereby releasing said parachute, when said wrapper is unwound.

7. An aerial signal arrangement comprising a flare casing, a parachute connected to said casing, a detachable parachute housing made of a plurality of separable parts, and a flexible wrapper wound around said casing and said housing, said wrapper having its outer edge weighted, said wrapper normally securing said casing and said housing together but releasing the parts of said housing from engagement with said casing when said wrapper is unwound, with a spring under compression contained in said housing for automatically separating said parts when the unwinding of said wrapper has been completed.

8. An aerial signal arrangement comprising a flare casing, a parachute connected to said casing, a detachable parachute housing made of a plurality of separable parts, and a flexible wrapper wound around said casing and said housing, said wrapper having its outer edge weighted, said wrapper normally securing said casing and said housing together but releasing the parts of said housing from engagement with said casing when said wrapper is unwound, with a curved spring under compression held in said housing and separating the parts of said housing, and thereby releasing said parachute, when said wrapper is unwound.

9. An aerial signal arrangement comprising a flare casing provided with a grooved plug forming its upper head, a parachute connected to said casing, a detachable parachute housing made of a plurality of hollow cylindrical segments and a separable head, said segments having a rib adapted to engage the groove in said plug, and a flexible wrapper wound around said casing and said segments, and normally securing said casing and said housing together but releasing the parts of said housing from engagement with said casing when said wrapper is unwound.

10. An aerial signal arrangement comprising a flare casing provided with a grooved plug forming its upper head, a parachute connected to said casing, a detachable parachute housing made of a plurality of hollow cylindrical segments, and a separable head, said segments having a rib adapted to engage the groove in said plug, and a flexible wrapper would around said casing and said segments, and normally securing said casing and said housing together but releasing the parts of said housing from engagement with said casing when said wrapper is unwound, with automatic means for separating the segments of said housing, and thereby releasing said parachute, when said wrapper is unwound.

11. An aerial signal arrangement comprising a flare casing provided with a grooved plug forming its upper head, a parachute connected to said casing, a detachable parachute housing made of a plurality of hollow cylindrical segments and a separable grooved head, said segments having ribs adapted to engage the grooves in both of said plugs, and a flexible wrapper wound around said casing and said segments, and normally securing said casing and said housing together but releasing the parts of said housing from engagement with said casing when said wrapper is unwound.

12. An aerial signal arrangement comprising a flare casing provided with a grooved plug forming its upper head, a parachute connected to said casing, a detachable parachute housing made of a plurality of hollow cylindrical segments, and a separable grooved head, said segments having ribs adapted to engage the grooves in both of said plugs, and a flexible wrapper wound around said casing and said segments, and normally securing said casing and said housing together but releasing the parts of said housing from engagement with said casing when said wrapper is unwound, with automatic means for separating the segments of said housing, and thereby releasing said parachute, when said wrapper is unwound.

13. The method of delaying the igniting of that type of aerial flares in which the parachute both ignites the flare when distended and thereafter supports the flare as it gradually descends, which consists in wrapping a flexible band around the parachute and flare, and allowing this band to unwind under the action of the air until the parachute is released.

14. The method of retarding the ignition of aerial flares which consists in wrapping around the flare casing a band of flexible material which will unwind as the flare falls through the air, finally releasing the ignition means whereby such ignition is effected.

SAMUEL D. WILEY.